United States Patent
She

(10) Patent No.: US 7,992,006 B2
(45) Date of Patent: Aug. 2, 2011

(54) SMART CARD DATA PROTECTION METHOD AND SYSTEM THEREOF

(75) Inventor: Ying-Hui She, Taichung (TW)

(73) Assignee: Mitac International Corp., Taoyuan (TW)

( * ) Notice: Subject to any disclaimer, the term of this patent is extended or adjusted under 35 U.S.C. 154(b) by 1030 days.

(21) Appl. No.: 11/834,285

(22) Filed: Aug. 6, 2007

(65) Prior Publication Data

US 2009/0044025 A1   Feb. 12, 2009

(51) Int. Cl.
G06F 21/00 (2006.01)
G06F 7/04 (2006.01)
G06F 17/30 (2006.01)
H04M 3/16 (2006.01)

(52) U.S. Cl. ........ 713/182; 713/150; 713/164; 713/165; 713/166; 713/167; 713/183; 713/184; 713/185; 713/186; 726/26; 726/27; 726/28; 726/29; 726/30; 455/410; 455/411; 455/26.1

(58) Field of Classification Search .................. 713/150, 713/164–167, 182–186; 726/26–30; 455/410, 455/411, 26.1

See application file for complete search history.

(56) References Cited

U.S. PATENT DOCUMENTS

| 6,351,813 | B1 * | 2/2002 | Mooney et al. ................ 713/185 |
| 7,870,614 | B1 * | 1/2011 | Duhaime et al. ................ 726/28 |
| 2005/0147247 | A1 * | 7/2005 | Westberg et al. ............. 380/200 |
| 2007/0214369 | A1 * | 9/2007 | Roberts et al. ................ 713/192 |

* cited by examiner

*Primary Examiner* — Taghi Arani
*Assistant Examiner* — Madhuri Herzog
(74) *Attorney, Agent, or Firm* — Tim Tingkang Xia; Morris, Manning & Martin, LLP

(57) ABSTRACT

A data protection method and system thereof used for a smart card, wherein, the user may select a data frame in a smart card through a data access interface, and input data into the data frame. The data protection system includes a data protection module, an encryption-decryption module, and a data storage module. The data protection module is coupled respectively to a data access interface and a smart card. The encryption-decryption module is coupled to the data protection module, and is used to generate an encrypted data frame and a fake data frame. The data protection module is used to store the fake data frame into a smart card. When it is desired to access the data frame, the data access interface is used to read out the corresponding fake data frame.

10 Claims, 5 Drawing Sheets

SMART CARD DATA PROTECTION METHOD AND SYSTEM THEREOF

BACKGROUND

1. Field of Invention

The invention relates to a smart card data access protection method and system, and in particular to a data access protection method and system having Subscriber Identity Module (SIM) utilized for a mobile communication device.

2. Related Art

Nowadays, in a modern society of mass communications, mobile phone has become a portable and indispensable communication device for every person, and the personal telephone directory utilized in mobile phone communications is also essential. In the past, a telephone directory may be used to record only the telephone numbers of the receiving parties. However, in recent days, a personal telephone directory is usually used to record other related data of a receiving party, such as birthday, residence phone number, residence address, company address, facsimile number and/or e-mail address of a receiving party.

In general, a personal telephone directory of the user is stored in a Subscriber Identity Module (SIM), which is hereinafter referred to as an SIM card. An SIM card is composed of a central processing unit (CPU), read-only-memory (ROM), random-access-memory (RAM), programmable ROM, and input/output circuitry. Upon issuing an order to an SIM card through a mobile phone handset by a user, the SIM card may execute or refuse to execute the order given by a mobile phone handset in compliance with its Standard Specification. In Global System for Mobile Communications (GSM) 11.11, the various access operations of SIM card are specified, so that user may readily move the account numbers of telecommunication service providers, short messages, and personal phone directory stored in an SIM card among various different handsets.

FIG. 1 is a schematic diagram of a personal phone directory data storage frame of an SIM card. For each of the data item stored in a phone directory, it may be viewed as a separate and independent data frame. In each of the data frame, a plurality of data fields are provided, and that are utilized to record the name, telephone number, residence address, and e-mail address of the receiving party. FIG. 2 is a schematic diagram of the framework of an operation terminal and an SIM card. Herein, the operational terminal is not restricted to mobile phone handset, it could also be a card reader or other SIM card access device. In operation, a user may issue related orders to an access interface through an operation terminal, then accessing and obtaining various data in an SIM card through the access interface.

To a user of such an SIM card, all the data contained therein is very personal and confidential. Thus, in order to prevent the illegal usage of data contained in an SIM card by an ill-intentioned person, a Personal Identity Number (PIN) is particularly specified by Global System for Mobile Communications (GSM), hereby restricting the access authority of SIM card.

As such, a user may lock the data in SIM card by making use of a PIN code, and in case that data in an SIM card is desired to be accessed, then a PIN code must be input to remove this restriction. However, according to design, the access mechanism of Global System for Mobile Communications (GSM) is used to impose restrictions on all the data stored in an SIM card, thus, upon activating the SIM card access mechanism, each time the user is to access the respective data in a phone directory, the PIN code must be input once to remove the access restrictions. Since PIN code only allows three input errors, thus after the third input error, all the data in SIM card will be locked altogether until another PIN Unlock Code (PUK) is input by the user. Yet PUK has the input limitation of 10 times. In case that PUK input exceeds 10 times, then all the data in an SIM card can no longer be read out. As such, though the afore-mentioned design is able to prevent the illegal access of phone directory, yet the convenience of legal access of phone directory is also restricted accordingly.

SUMMARY OF THE INVENTION

In view of the above-mentioned drawbacks and shortcomings of the prior art, the objective of the invention is to provide a data protection method for a smart card, with its major purpose of protecting the data read from and/or written into the data field corresponding to the data frame in a smart card.

To achieve the above-mentioned objective, the invention provide a data protection method for a smart card, that is used to write data into the data fields in the respective data frames of a smart card, the data protection method for smart card includes the following steps: firstly, selecting the corresponding data frame according to a first data field; next, performing encryption operation for data field of the corresponding data frame based on an encryption method, hereby the encrypted data frame thus produced is a fake data frame; and finally, storing the encrypted data frame into a data storage module, and using the fake data frame to over-write the selected data frame.

Moreover, to achieve the above-mentioned objective, the invention provides a data protection method for a smart card, that is used to read the data frame in a smart card. The data frame includes a first data field used to store private phone number. The data protection method includes the following steps: firstly, reading out the corresponding data frame from a smart card based on the first field; next, determining if the data frame thus obtained is a fake data frame, in case that the answer is positive, then reading out the encrypted data frame from the data storage module according to a first identification code, and performing a decryption operation for the encrypted data frame based on a second identification code.

According to another aspect, the another objective of the invention is to provide a data protection system for a smart card, with the purpose of protecting the data frame read from and write into a smart card.

Therefore, the objective of the invention is to provide a data protection system for a smart card, wherein, data is input into a data frame of a smart card by a user through a data access interface. Wherein, the data frame includes a first data field, that is used to store personal telephone numbers. The data protection system includes a data protection module, an encryption-decryption module, and a data storage module. The data protection module is coupled respectively to a data access interface and a smart card, and is used to generate an encrypted data frame and a fake data frame, and store the fake data frame into a smart card. The encryption-decryption module is coupled to the data protection module, and is used to generate an encrypted data frame. The data storage module is coupled to the encryption-decryption module, and is used to store the encrypted data frame.

Furthermore, the objective of the invention is to provide a data protection system for a smart card, that is used to read a specific data frame in a smart card. The data frame includes a first data field. The data protection system includes a data protection module, and is coupled respectively to a data access interface and a smart card, and is used to determine if the data frame is a fake data frame based on the data in the first data field. If the answer is positive, then a fake data frame is transmitted back to the data access interface; otherwise, the data frame is transmitted back to the data access interface.

In the application of the invention, the fake data is written into data frame of a smart card, thus protecting specific data items in a personal phone directory. As such, the user does not have to encrypt all the data in a phone directory of an ISM card, just for locking these specific data items. Even this SIM card is put into other handset, the encrypted directory items in the SIM card still can not be displayed.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus are not limitative of the present invention, and wherein.

DETAILED DESCRIPTION OF THE INVENTION

The purpose, construction, features, and functions of the invention can be appreciated and understood more thoroughly through the following detailed description with reference to the attached drawings.

Figure 3:
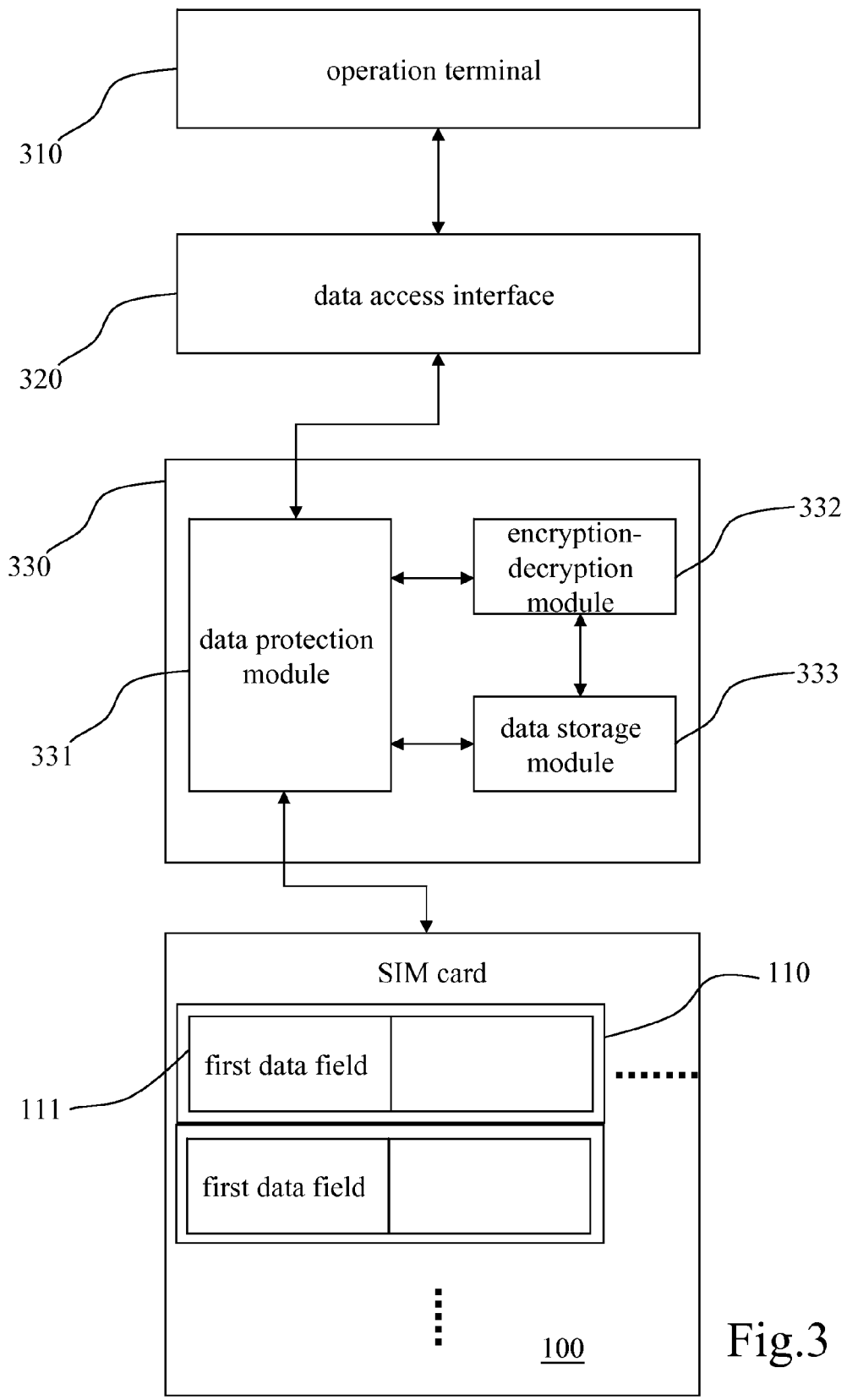
FIG. 3 is a schematic diagram of the preferred embodiment of the invention.

FIG. 3 is a schematic diagram of the preferred embodiment of the invention. The invention provides a data protection method and system of a smart card, that is used to protect the data read from and write into a smart card. In the invention, a smart card refers in particular to a subscriber identity module (SIM) card 100 used in a mobile communication device, and is referred hereinafter as a SIM card 100. In the invention, the data protection system of a smart card includes: an SIM card 100, an operation terminal 310, a data access interface 320, ad a data protection system 330.

In the above description, SIM card 100 is used to store personal phone directory data. In an SIM card 100, a plurality of data frames 110 are provided to store data respectively. In each of the respective data frames 110, at least a first data field 111 and a number of other data fields are included. It is assumed that the first data field 111 is used to store the first telephone number of the receiving party, while other data fields are used to store his/her name, address, photograph, ringing of incoming call and/or e-mail address. The operation terminal 310 is used to receive the instructions of a user, and then access the data in SIM card 100 through a data access interface 320. By way of example, the operation terminal 310 may be utilized to access the data in an SIM card 100 by making use of a card reader in cooperation with the related software or handset.

Figure 1:
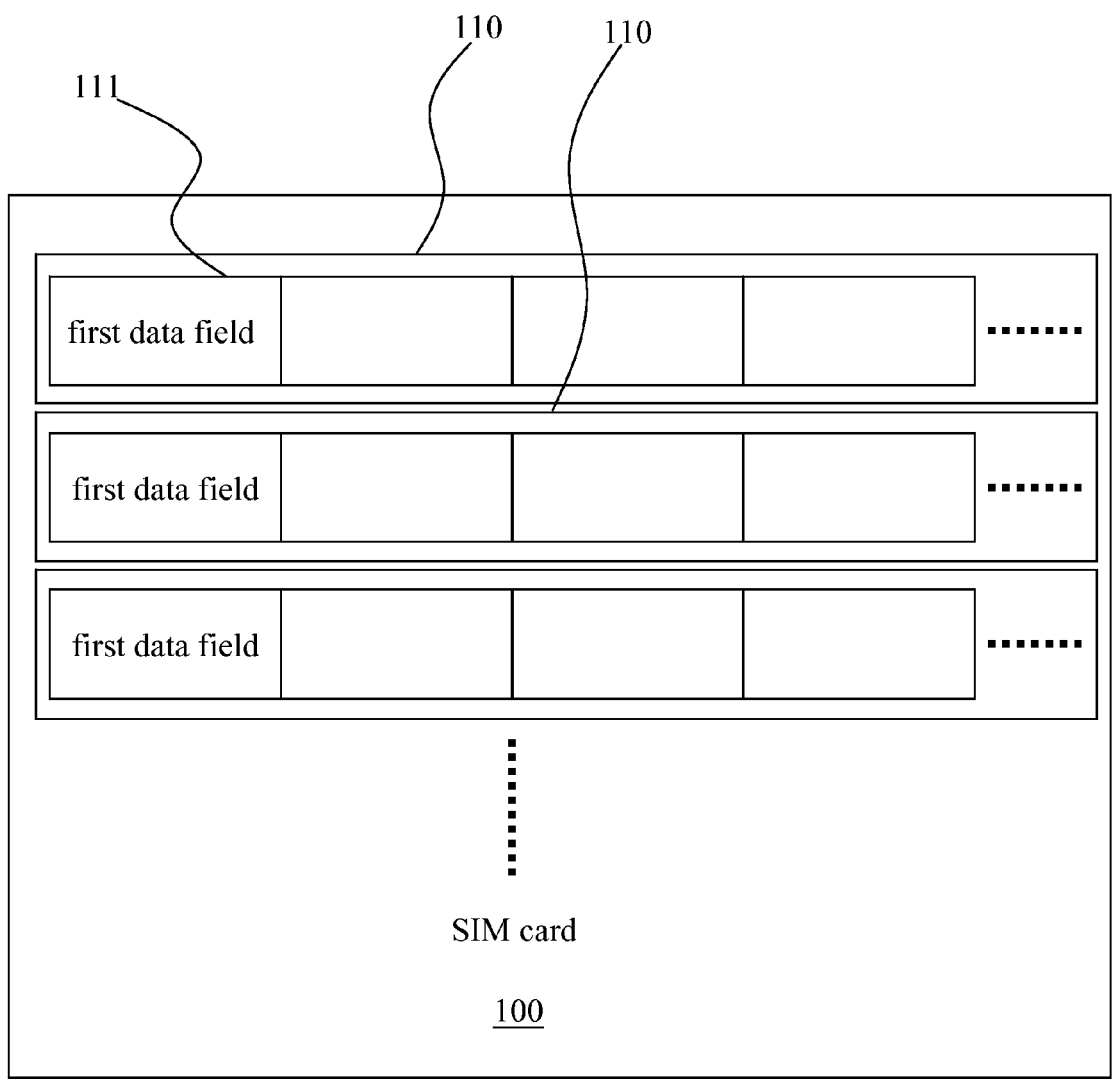
FIG. 1 is a schematic diagram of a personal phone directory data storage frame of an SIM card.
Figure 2:
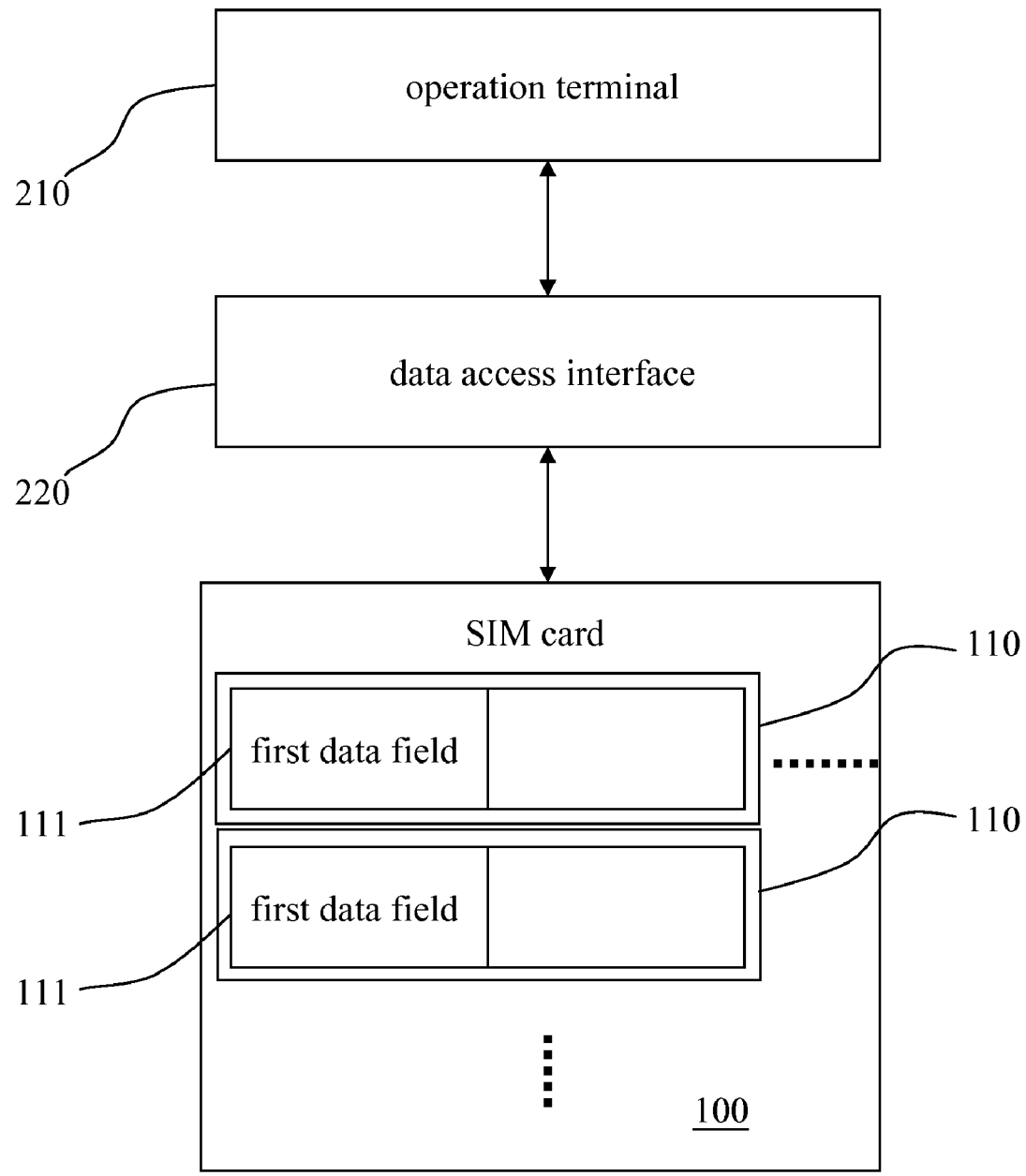
FIG. 2 is a schematic diagram of the framework of an operation terminal and an SIM card.

Moreover, the data access interface 320 is connected to an operation terminal 310, thus data access interface 320 is used to provide SIM 100 with various Application Program Interface (API), such as the Standard Tool Kits (STK) of various types of handsets, and SIM Management Programs. The data protection system 330 is connected between an SIM card 100 and a data access interface 320. The data protection system 330 further includes: a data protection module 331, an encryption-decryption module 332, and a data storage module 333. The data protection module 331 is coupled to the data access interface 320 and SIM card 100 respectively. The encryption-decryption module 332 is coupled to data protection module 331. The encryption-decryption module 332 is used to generate an encrypted data frame and a fake data frame (not shown) based on the received data frame 110 and an encryption algorithm. The data protection module 331 is used to utilize the fake data frame to over-write the original data frame 110. Refer to FIG. 1 for the composition and structure of encrypted data frame and fake data frame. The data storage module 333 is coupled to the encryption-decryption module 332, and is used to store the encrypted data frame generated by an encryption-decryption module 332.

Subsequently, refer to FIG. 4 for a flowchart of the data protection write process. Firstly, selecting the corresponding data frame based on a first data field (step S410); next, performing encryption operation on the data field of data frame based on encryption method (step S420), hereby generating an encrypted data frame and a fake data frame (step S430); and finally, overwriting the fake data frame onto the original data frame (step S440), and storing the encrypted data frame into the date storage module (step S450).

Figure 4:
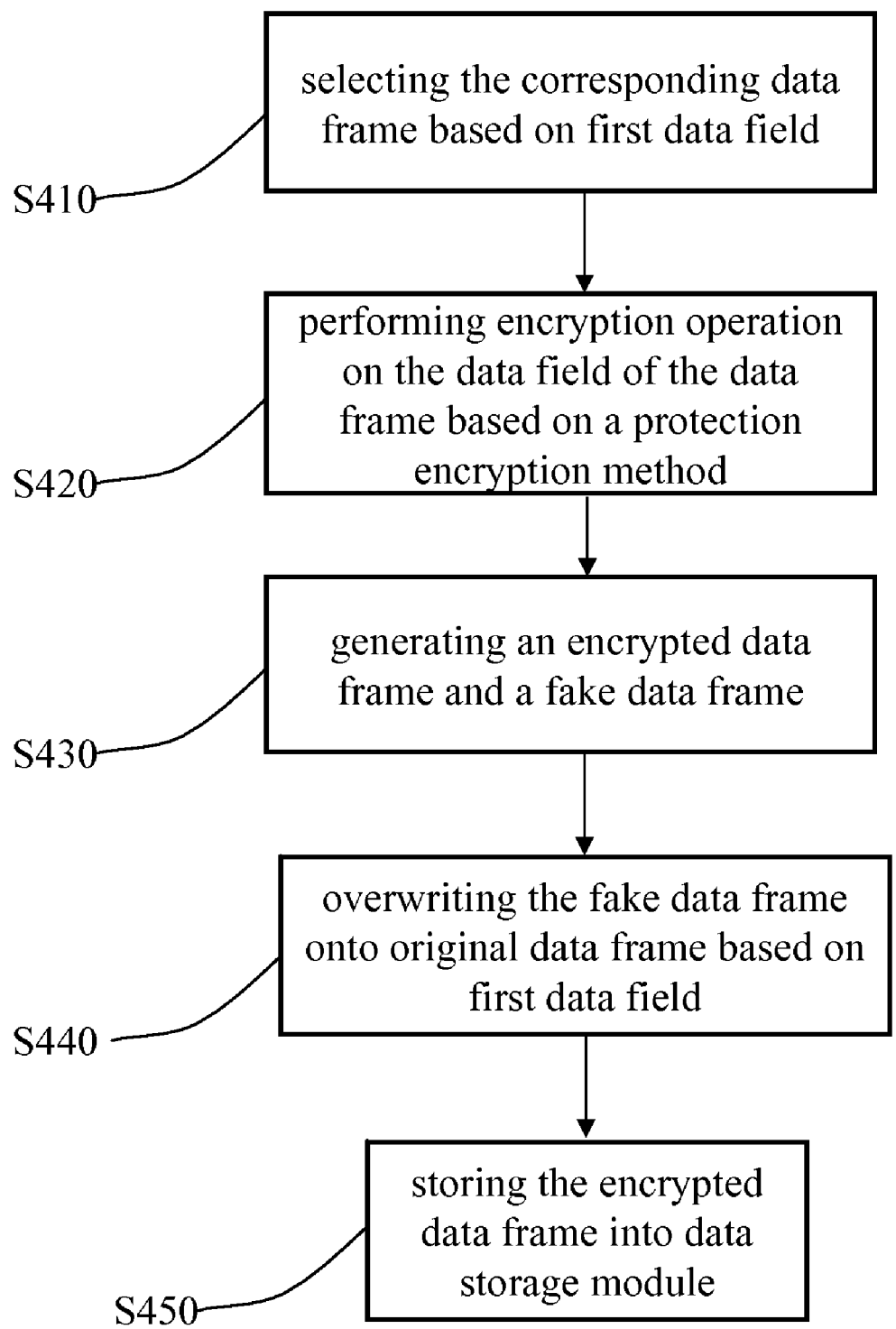
FIG. 4 is a flowchart of the data protection write process.

To facilitate the explanation of the elements and operations of the data protection write system of the embodiment, please refer concurrently to FIGS. 3 and 4. Firstly, a data frame 110 is selected by the user based on a first data field 111 (corresponding to step S410). Wherein, the first data field 111 contains a mobile phone number, and the data frame 110 is recorded the phone directory related data corresponding to the mobile phone number. The mobile phone number is taken as an example, a mobile phone number has a single one-to-one correspondence relation with a receiving party, and in other words, each of the respective mobile phone numbers may correspond to only one receiving party. Naturally, the first data field may contain other related information of a receiving party, and it is not restricted to a mobile phone number. The user may decide the encryption method utilized by the system (corresponding to step S420), hereby performing encryption processing of the data in a data frame 110. As such, the encryption method can be chosen from one of the following comprising the group of: a Secure Hashing Algorithm (SHA-1), a Rivest-Shamir-Adleman (RSA) secret key encoding technology, an Advanced Encryption Standard (AES), and MD5 Hashing Algorithm.

Subsequently, the system is used to generate an encrypted data frame and a fake data frame through operation of data frame 110 by an encryption-decryption module 332 according to an encryption method selected by the user (corresponding to step S430). The encrypted data frame is obtained through processing a data frame 110 by means of the above-mentioned encryption algorithm. Furthermore, a fake data frame is obtained from a data frame through a data protection module by utilizing a random number data or blank data, and then it is written into a first data field 111 belonging to that fake data frame. And finally, the system utilizes the fake data frame to over-write the original data frame 110, and stores the encrypted data frame into a data storage module 333 (corresponding to steps S440 and S450).

Figure 5:
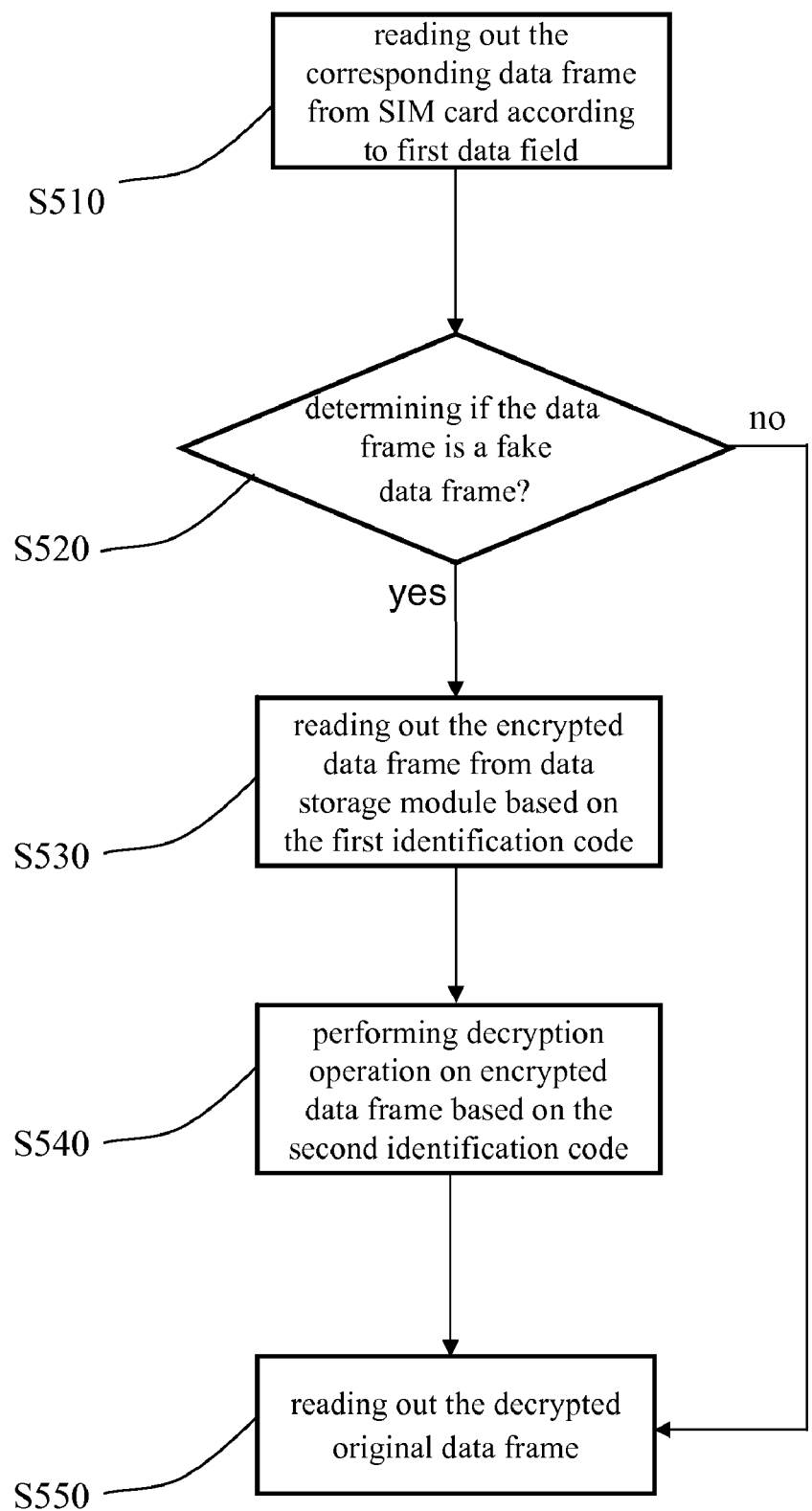
FIG. 5 is a flowchart of data protection read process.

Moreover, refer to FIG. 5 for a flowchart of data protection read process. As shown in FIG. 5, in selecting a data frame, a first data field is utilized as an index, hereby reading out the corresponding data frame from an SIM card (step S510). At this time, it has to be noted that, if the data stored in data frame 110 is an unencrypted directory, then the user may read directly the related data of the data frame 110. However if the data frame 110 storing the data is a fake data frame, then the data obtained by the user is meaningless or blank messages, thus preventing ill-intentioned person from accessing the directory in data frame 110.

To the original user, in directly accessing the data, the above-mentioned data of fake data frame may also be obtained, thus if the original user desires to retrieve the correct directory data, then the following steps have to be performed. Firstly, determining if the data frame 110 is a fake data frame (step S520). In case it is determined that the data frame 110 is a fake data frame, then read out the encrypted data frame from a data storage module based on a first identification code (step S530), the first identification code can be one of the following: user password, Personal Identification Number (PIN), and International Mobile Station Identity (IMSI). Subsequently, performing decryption operation on encrypted data frame as based on a second identification code (step S540), and then reading out the decrypted original data frame 110 (step S550). In this regard, the second identification code can be one of the following: user password, Personal Identification Number (PIN), and International Mobile Station Identity (IMSI).

In the following, the details of data read-out as performed by the system will be described in detail, refer to FIG. 3 & FIG. 5. Firstly, assuming that it is the original user who desires to access the phone directory, thus the user inputs a mobile phone number of a receiving party. Next, the system will search and find a data frame 110 corresponding to the phone number from an SIM card 100 according to this mobile phone number (corresponding to step S550). Then, the system will transmit and display the data frame 110 to the user. In case that the data frame 110 corresponding to this phone number has not been processed by data protection measures, then the system will display the related data contained in the data frame 110, such as the name, address, e-mail address, or the company facsimile number of the receiving party of the phone number. Conversely, if the data frame 110 is a fake data frame, then the data displayed by the system is meaningless or the data is blank message (corresponding to steps S520 and S550). Therefore, when a user desires to read a phone directory in the original data frame 110, he must first pass through the verification of the data storage module and the encryption-decryption module, then the directory contained in the original data frame 110 can be read out. As such, the verification method can be realized through utilizing one of the followings: user password, personal identification number (PIN), and international mobile station identity (IMSI) (corresponding to steps S530 to S550).

According to the afore-mentioned data protection system and method, a user may proceed with the various encryption processes relative to different data frames. For example, different encoding or encryption algorithm may be utilized to protect different data frame. Moreover, the display messages indicating fake data frame can be varied. By way of example, upon reading and obtaining a fake data frame, the system may display various error messages such as "no such persons" or "wrong number" to deceive the illegal users.

In the invention, the data protection system is utilized to access data frame in an SIM card. Upon proceeding with encryption-decryption protection of the data in data frame, a fake data frame and an encrypted data frame are written into the original data frame and data storage module 333 respectively. In case other user desires to access this data frame, he may only read out the data overwritten by the fake data frame, while the real and authentic user may readily choose the data frame to be protected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data protection method used for a smart card, said smart card having at least a data frame connected with a data protection system comprising a data storage module, and said data protection system being connected to a data access interface, said data frame including at least a first data field, said data protection method comprising the following steps:
    selecting corresponded said data frame based on said first data field;
        generating an encrypted data frame and a fake data frame through performing an encryption operation on a data field of said data frame as based on an encryption method;
    storing said encrypted data frame into said data storage module; and
    using said fake data frame to overwrite corresponded said data frame of said smart card;
    receiving a mobile phone number;
    reading out a data frame from said smart card corresponding to said mobile phone number;
    determining if the data frame corresponding to said mobile phone number is a fake data frame;
    if the data frame corresponding to said mobile phone number is said fake data frame, using a first identification code to be a first verification password for passing a verification to search and read said encrypted data frame from a data storage module based on said first identification code and using a second identification code to be a second verification password for performing a decryption operation on said encrypted data frame; and
    if the data frame corresponding to said mobile phone number is not said fake data frame, outputting the data frame corresponding to said mobile phone number;
    wherein, a random number data or a blank data is generated to write said random number data or said blank data into a plurality of data fields of said fake data frame.

2. The data protection method used for the smart card as claimed in claim 1, wherein said smart card is a Subscriber Identity Module (SIM).

3. The data protection method used for the smart card as claimed in claim 1, wherein said first data field is used to store a first telephone number.

4. The data protection method used for the smart card as claimed in claim 1, wherein said encryption method is selected from of the following comprising the group of: a Secure Hashing Algorithm (SHA-1), a Rivest-Shamir-Adleman (RSA) secret key encoding technology, an Advanced Encryption Standard (AES), and an MD5 Hashing Algorithm, and that is used to process the data in data field of said data frame in an encryption manner, thus generating said encrypted data frame.

5. The data protection method used for the smart card as claimed in claim 1, wherein said first identification code is one of the following: user password, Personal Identification Number (PIN), and International Mobile Station Identity (IMSI).

6. The data protection method used for the smart card as claimed in claim 1, wherein said first identification code is one of the following: user password, Personal Identification Number (PIN), and International Mobile Station Identity (IMSI).

7. A data protection system used for a smart card, said data protection system is coupled between a data access interface and a smart card and implemented using a mobile phone, said smart card comprising at least a data frame and said data frame including at least a first data field, said data protection system comprising:
 an encryption-decryption module used to process said data frame to generate an encrypted data frame and a fake data frame in an encryption manner;
 a data storage module; and
 a data protection module coupled respectively to said data access interface, said smart card, and said encryption-decryption being used to store said fake data frame into said smart card for overwriting said data frame and store said encrypted data frame into said data storage module;
 wherein, a random number data or a blank data is generated to write said random number data or said blank data into a plurality of data fields of said fake data frame;
 wherein, the data protection system receives a mobile phone number, reads out a data frame from said smart card corresponding to said mobile phone number, and determines if the data frame corresponding to said mobile phone number is a fake data frame;
 if the data frame corresponding to said mobile phone number is said fake data frame, the data protection system uses a first identification code to be a first verification password for passing a verification to search and read said encrypted data frame from a data storage module based on said first identification code, and uses a second identification code to be a second verification password for performing a decryption operation on said encrypted data frame; and
 if the data frame corresponding to said mobile phone number is not said fake data frame, the data protection system outputs the data frame corresponding to said mobile phone number.

8. The data protection system used for the smart card as claimed in claim 7, wherein said smart card is a Subscriber Identity Module (SIM).

9. The data protection system used for the smart card as claimed in claim 7, wherein said first data field is used to store a first telephone number.

10. The data protection system used for the smart card as claimed in claim 7, wherein said encryption module is used to select from of the following comprising the group of: a Secure Hashing Algorithm (SHA-1), a Rivest-Shamir-Adleman (RSA) secret key encoding technology, an Advanced Encryption Standard (AES), and an MD5 Hashing Algorithm, hereby processing the data in data field of said data frame in an encryption manner, thus generating said encrypted data frame.

* * * * *